United States Patent
Colgrove et al.

(10) Patent No.: US 9,516,016 B2
(45) Date of Patent: Dec. 6, 2016

(54) STORAGE ARRAY PASSWORD MANAGEMENT

(71) Applicant: PURE STORAGE, INC., Mountain View, CA (US)

(72) Inventors: John Colgrove, Los Altos, CA (US); Ethan Miller, Santa Cruz, CA (US); John Hayes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/076,468

(22) Filed: Nov. 11, 2013

(65) Prior Publication Data

US 2015/0134950 A1 May 14, 2015

(51) Int. Cl.
*H04L 29/06* (2006.01)
*G06F 21/30* (2013.01)
*G06F 21/31* (2013.01)
*G06F 21/46* (2013.01)

(52) U.S. Cl.
CPC ......... *H04L 63/0846* (2013.01); *G06F 21/305* (2013.01); *G06F 21/31* (2013.01); *G06F 21/46* (2013.01); *H04L 63/083* (2013.01); *H04L 63/0838* (2013.01)

(58) Field of Classification Search
CPC ............. H04L 63/083; H04L 63/0838; H04L 63/0846; G06F 21/305
See application file for complete search history.

(56) References Cited

U.S. PATENT DOCUMENTS

| 4,924,514 A | 5/1990 | Matyas et al. |
|---|---|---|
| 5,208,813 A | 5/1993 | Stallmo |
| 5,557,765 A | 9/1996 | Lipner et al. |
| 6,035,041 A | 3/2000 | Frankel et al. |
| 6,412,045 B1 | 6/2002 | DeKoning et al. |
| 6,470,454 B1 | 10/2002 | Challener et al. |
| 6,799,283 B1 | 9/2004 | Masaaki et al. |
| 6,915,434 B1 | 7/2005 | Kuroda |
| 6,931,128 B2 | 8/2005 | Roberts |
| 7,028,216 B2 | 4/2006 | Aizawa et al. |

(Continued)

FOREIGN PATENT DOCUMENTS

| GB | 2344977 A | 6/2000 |
|---|---|---|
| WO | 98/49804 A1 | 11/1998 |

(Continued)

OTHER PUBLICATIONS

International Search Report and Written Opinion in application No. PCT/US2013/061626 mailed Feb. 10, 2014 pp. 1-13.

(Continued)

*Primary Examiner* — Morshed Mehedi
*Assistant Examiner* — Vance Little
(74) *Attorney, Agent, or Firm* — Brandon C. Kennedy; Kennedy Lenart Spraggins LLP (57) ABSTRACT

A system and method for generating passwords for secure login to a storage array. A randomly generated root secret is utilized along with a compartment ID to generate a root password for logging into a storage array with root privileges. The root secret is encrypted with the public key of a public-private key pair and stored on the storage array. The encrypted root secret is then stored in the storage array. When root access is needed, a private key stored externally to the storage array is utilized to decrypt the root secret. The decrypted root secret is then used along with the compartment ID to regenerate the root password.

16 Claims, 7 Drawing Sheets

(56) References Cited

U.S. PATENT DOCUMENTS

| | | | |
|---|---|---|---|
| 7,216,164 | B1 | 5/2007 | Whitmore et al. |
| 7,225,339 | B2 | 5/2007 | Asano et al. |
| 7,599,976 | B1 | 10/2009 | Logue et al. |
| 8,037,319 | B1 | 10/2011 | Clifford |
| 8,321,682 | B1* | 11/2012 | Read .................... H04L 9/3228 380/44 |
| 8,352,540 | B2 | 1/2013 | Anglin et al. |
| 8,718,283 | B2 | 5/2014 | Whyte |
| 8,745,415 | B2 | 6/2014 | Miller et al. |
| 9,423,967 | B2 | 8/2016 | Colgrove et al. |
| 9,436,396 | B2 | 9/2016 | Colgrove et al. |
| 9,436,720 | B2 | 9/2016 | Colgrove et al. |
| 9,454,476 | B2 | 9/2016 | Colgrove et al. |
| 9,454,477 | B2 | 9/2016 | Colgrove et al. |
| 2002/0038436 | A1 | 3/2002 | Suzuki |
| 2002/0094085 | A1 | 7/2002 | Roberts |
| 2002/0159601 | A1* | 10/2002 | Bushmitch .............. H04L 29/06 380/277 |
| 2002/0164033 | A1 | 11/2002 | Rajasekaran |
| 2003/0084290 | A1 | 5/2003 | Murty et al. |
| 2004/0049572 | A1 | 3/2004 | Yamamoto et al. |
| 2004/0117649 | A1 | 6/2004 | Whyte |
| 2005/0033964 | A1* | 2/2005 | Albanese .............. H04N 7/163 713/171 |
| 2005/0132203 | A1* | 6/2005 | Dharmarajan .......... G06F 21/46 713/183 |
| 2005/0268345 | A1* | 12/2005 | Harrison ............... G06F 21/305 726/27 |
| 2007/0171562 | A1 | 7/2007 | Maejima et al. |
| 2007/0220313 | A1 | 9/2007 | Katsuragi et al. |
| 2007/0300076 | A1* | 12/2007 | Diffie .................... G06F 21/46 713/184 |
| 2008/0049942 | A1* | 2/2008 | Sprunk et al. ............... 380/283 |
| 2008/0059699 | A1 | 3/2008 | Kubo et al. |
| 2008/0095375 | A1 | 4/2008 | Tateoka et al. |
| 2008/0155191 | A1 | 6/2008 | Anderson et al. |
| 2008/0178040 | A1 | 7/2008 | Kobayashi |
| 2008/0275928 | A1 | 11/2008 | Shuster |
| 2009/0077379 | A1 | 3/2009 | Geyzel et al. |
| 2009/0099967 | A1 | 4/2009 | Yokota et al. |
| 2009/0177894 | A1 | 7/2009 | Orsini et al. |
| 2009/0204858 | A1 | 8/2009 | Kawaba |
| 2009/0228648 | A1 | 9/2009 | Wack |
| 2010/0067706 | A1 | 3/2010 | Anan et al. |
| 2010/0215172 | A1 | 8/2010 | Schneider |
| 2010/0250882 | A1 | 9/2010 | Hutchison et al. |
| 2010/0266120 | A1 | 10/2010 | Leggette et al. |
| 2010/0299521 | A1 | 11/2010 | Koike |
| 2011/0019818 | A1 | 1/2011 | Ma |
| 2011/0238634 | A1 | 9/2011 | Kobara |
| 2011/0246766 | A1 | 10/2011 | Orsini et al. |
| 2011/0289383 | A1 | 11/2011 | Dhuse et al. |
| 2012/0023375 | A1 | 1/2012 | Dutta et al. |
| 2012/0166818 | A1 | 6/2012 | Orsini |
| 2012/0254622 | A1 | 10/2012 | Kanungo |
| 2012/0284534 | A1 | 11/2012 | Yang |
| 2013/0046995 | A1 | 2/2013 | Movshovitz |
| 2013/0047029 | A1 | 2/2013 | Ikeuchi et al. |
| 2013/0091102 | A1 | 4/2013 | Nayak |
| 2013/0339303 | A1 | 12/2013 | Potter et al. |
| 2014/0089683 | A1 | 3/2014 | Miller et al. |
| 2014/0089730 | A1 | 3/2014 | Watanabe et al. |
| 2014/0172929 | A1 | 6/2014 | Sedayao et al. |
| 2014/0208112 | A1 | 7/2014 | McDonald et al. |
| 2014/0250303 | A1 | 9/2014 | Miller et al. |
| 2014/0281308 | A1 | 9/2014 | Lango et al. |
| 2015/0127946 | A1 | 5/2015 | Miller et al. |
| 2015/0234709 | A1 | 8/2015 | Koarashi |
| 2015/0244775 | A1 | 8/2015 | Vibhor et al. |
| 2015/0278534 | A1 | 10/2015 | Thiyagarajan et al. |
| 2016/0019114 | A1 | 1/2016 | Han et al. |

FOREIGN PATENT DOCUMENTS

| | | |
|---|---|---|
| WO | 03/032133 A2 | 4/2003 |
| WO | WO-2008/102347 A1 | 8/2008 |
| WO | WO-2010/071655 A1 | 6/2010 |

OTHER PUBLICATIONS

Shamir, et al. "How to Share a Secret", IP.Com Inc., West Henrietta, NY, US, Mar. 30, 2007, XP013119902, ISSN: 1533-0001, pp. 1-9.

Miller, et al., U.S. Appl. No. 14/073,618, entitled "Data Protection in a Storage System Using External Secrets", filed Nov. 6, 2013, 37 pages.

Non-Final Office Action in U.S. Appl. No. 13/627,444, mailed Dec. 23, 2013, 6 pages.

Notice of Allowance in U.S. Appl. No. 13/627,444, mailed Apr. 14, 2014, 5 pages.

Non-Final Office Action in U.S. Appl. No. 14/258,826, mailed Jan. 21, 2015, 22 pages.

Non-Final Office Action in U.S. Appl. No. 14/073,618, mailed Dec. 18, 2014, 9 pages.

Resch, et al., "AONT-RS: Blending Security and Performance in Dispersed Storage Systems", FAST'11 Proceedings of the 9th USENIX Conference on File and Storage Technologies, Feb. 15, 2011, 12 pages, USENIX Association Berkeley, CA, USA.

Resch, et al., "AONT-RS: Blending Security and Performance in Dispersed Storage Systems", USENIX.org, 26 pages, <http://www.usenix.org/events/fast11/tech/slides/resch.pdf>. [Retrieved Feb. 25, 2015].

International Search Report and Written Opinion in application No. PCT/US2014/062383, mailed Feb. 2, 2015, 10 pages.

Menezes, et al., "Chapter 13: Key Management Techniques", Handbook of Applied Cryptography, Oct. 1, 1996, pp. 543-590, CRC Press, Inc., Boca Raton, FL, USA.

International Search Report and Written Opinion in International Application No. PCT/US2014/064379, mailed Feb. 18, 2015, 9 pages.

Final Office Action U.S. Appl. No. 14/258,826, May 8, 2015, 1-29.

Office Action U.S. Appl. No. 14/073,618, Jun. 18, 2015, 1-16.

Microsoft Corporation, "GCSettings.IsServerGC Property", Retrieved Oct. 27, 2013 via the WayBack Machine, 3 pages.

Microsoft Corporation, "Fundamentals of Garbage Collection", Retrieved Aug. 30, 2013 via the WayBack Machine, 11 pages.

\* cited by examiner

STORAGE ARRAY PASSWORD MANAGEMENT

BACKGROUND

Field of the Invention

This invention relates to managing passwords for a storage array.

Description of the Related Art

The amount and complexity of data that businesses daily manage continues to increase over time. Large-scale storage arrays, such as data centers, typically run many business operations. A data center, which also may be referred to as a server room, is a centralized repository, either physical or virtual, for the storage, management, and dissemination of data pertaining to one or more businesses. If the storage array has poor performance, company operations may be impaired. A storage array therefore maintains high standards for data availability and high-performance functionality.

A company may need support services to ensure proper functioning of their storage array(s). Allowing remote access to support engineers is one possible solution for updating or fixing problems affecting the storage array. However, allowing remote access to the storage array may have unintended consequences. For example, an unauthorized person may be able to remotely access sensitive data on the storage array by obtaining the password needed to remotely login to the storage array. Depending on the type of support needed for the storage array, different levels of access may be needed.

Traditional computer operating systems allow some users to have extra privileges and authority to modify the operating system of the computer. For example, an operating system may offer different levels of authority to users. A given computer operating system may have two levels. The first level, which can be called the root or administrator level, allows the user the unlimited ability to modify the computer. The second level is the level assigned to regular users. Other users have limited or no authority to change the operating system. These users are limited in what they can do and in what changes they can make to the computer. Depending on the operating system, some computers recognize other intermediate levels, which grant some users additional rights.

The level of support required to fix a given problem may require the support engineer to have root access to the storage array operating system. It can be challenging to prevent unauthorized users from gaining root access while still allowing a support engineer to have root access.

In view of the above, improved techniques for managing passwords in a storage array environment are desired.

SUMMARY OF THE INVENTION

Various embodiments of systems and methods for managing passwords in a storage array are contemplated.

In one embodiment, a storage array may generate a new root password on a regularly scheduled basis, wherein the root password allows root access to the operating system of the storage array. The storage array may include a storage controller and one or more storage devices. The storage array may be coupled to one or more host client systems.

To generate a new root password, a randomly generated character sequence (or root secret) may be combined with a compartment ID of the storage array. In one embodiment, the root secret may be converted into an ASCII representation, and then the compartment ID may be appended to the ASCII representation of the root secret. One or more transformations may also be applied to this value to create the new root password. Then, the new root password may be set for the storage array. Additionally, the root secret may be encrypted with a public key of a public-private key pair, and then the encrypted root secret may be stored in a designated file on the storage array. The encrypted root secret may be accessible only to an authorized local user of the storage array. The private key of the public-private key pair may be stored externally from the storage array.

When a user or administrator of the storage array requires root access, the user may initiate a process to regenerate the root password. To regenerate the root password, the encrypted root secret may be conveyed to an authorized remote user, such as a support engineer, on a remote computing device. The support engineer may have access to the private key of the public-private key pair. The encrypted root secret may then be decrypted by the authorized support engineer using the private key. The support engineer may then utilize the root secret and the compartment ID to regenerate the root password of the storage array. Alternatively, the support engineer may decrypt the encrypted root secret and then convey the root secret to the local user of the storage array. The user may then combine the root secret with the compartment ID and then perform one or more transformations to create the root password. The user may then utilize the root password to login to the computing device with root privileges.

These and other embodiments will become apparent upon consideration of the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Figure 1:
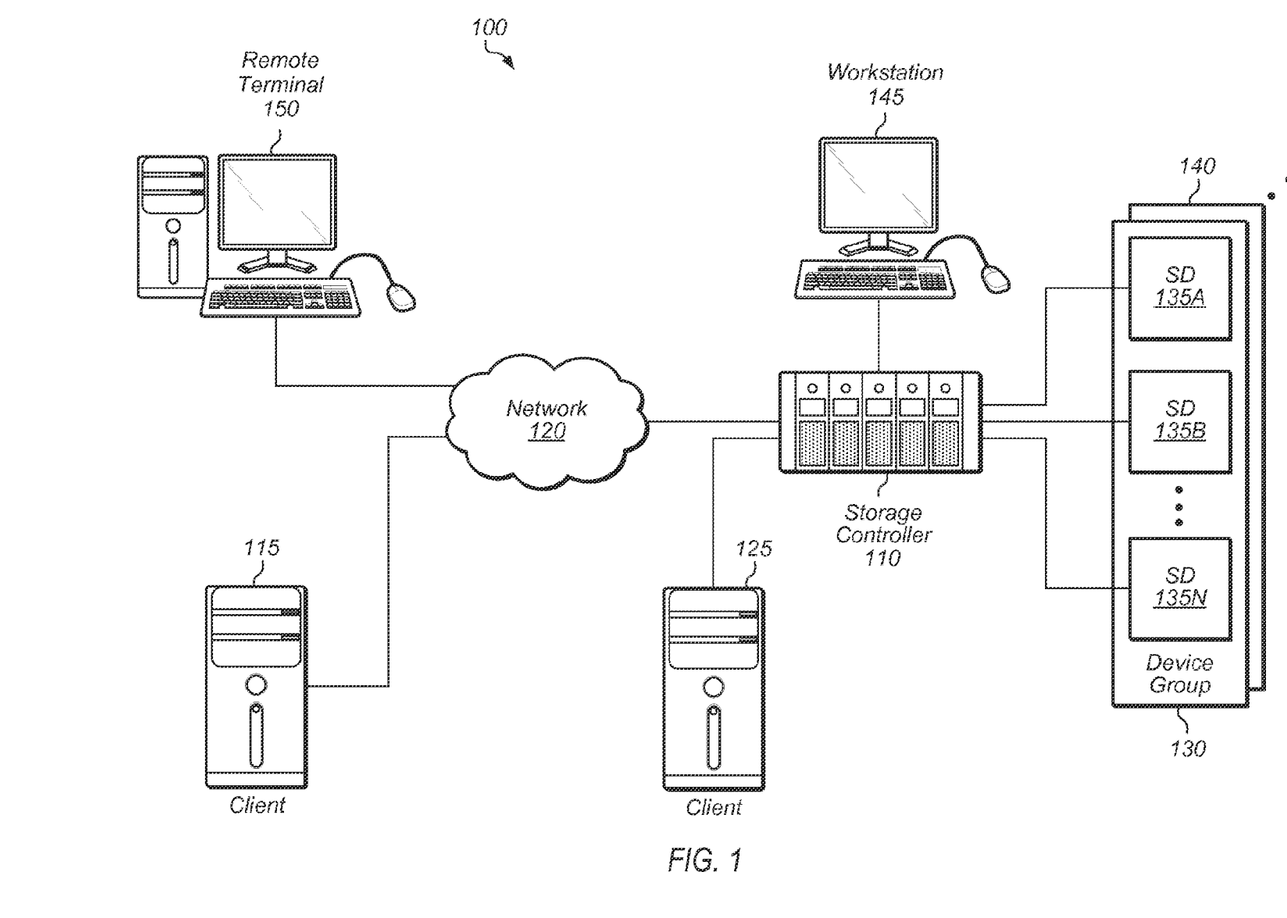
FIG. 1 is a generalized block diagram illustrating one embodiment of a storage system.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to workstation 145, and storage controller 110 may be coupled remotely to remote terminal 150. Storage controller 110 may also be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Workstation 145 may be configured to allow a user or administrator to login to storage controller 110 to manage and control storage system 100. Workstation 145 may provide a display and input device(s) for the user to interface with the OS and/or control software running on storage controller 110. Storage controller 110 may run any type of OS (e.g., Windows®, Unix®, Linux®, Solaris®, MacOS®) depending on the embodiment.

There may be different levels of accounts for accessing storage controller 110 from workstation 145 or remote terminal 150. A first level may be a user account for accessing storage controller 110 locally while being present at workstation 145. A second level may be a support engineer account for providing support remotely from a remote terminal 150. A support engineer account may not have access to client data stored in storage device groups 130 and 140. Each separate user may have a separate password, and each support engineer logging in remotely may also have a unique password. A third level may be a root level account for root access to storage controller 110. The root level account has root privileges enabling access to all commands and files of storage controller 110. The root password may be protected by an encryption scheme to prevent an unauthorized user gaining access to the root password and intentionally harming system 100.

It is noted that in alternative embodiments, the number and type of client computers, storage controllers, networks, storage device groups, workstations, remote terminals, and data storage devices is not limited to those shown in FIG. 1. Furthermore, in various embodiments, the methods and mechanisms disclosed herein can be implemented in various networks and systems including computer systems, security systems, wireless networks, network architectures, data centers, operating systems, communication devices, and various other devices and systems.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125, remote terminal 150, and workstation 145 are representative of any number and type of stationary or mobile computers such as desktop personal computers (PCs), servers, server farms, workstations, laptops, handheld computers, servers, personal digital assistants (PDAs), smart phones, and so forth. Generally speaking, client computer systems 115 and 125, remote terminal 150, and workstation 145 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
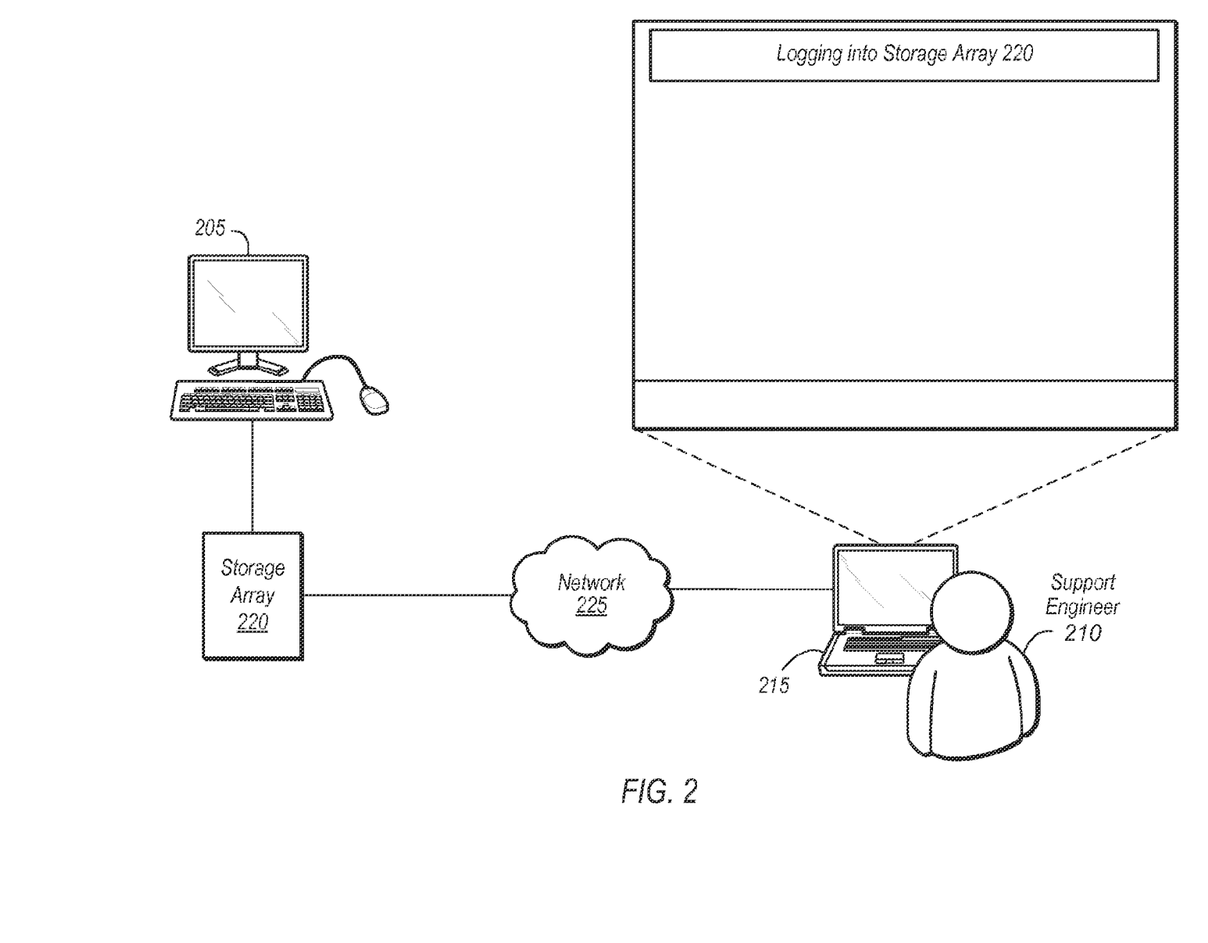
FIG. 2 is a block diagram illustrating one embodiment of a system for remotely accessing a computing device.

Turning now to FIG. 2, a block diagram of one embodiment of a system for providing remote support to a computing device is shown. Storage array 220 may be configured to allow support engineer 210 (using computing device 215) to remotely login to a user account on storage array 220 via network 225. Storage array 220 may be configured to allow a local user (using computing device 205) to login to a more privileged user account on storage array 220. In one embodiment, computing device 205 may be a workstation coupled to storage array 220. In other embodiments, computing device 205 may be any of various other types of computing devices.

In one embodiment, support engineer 210 may login remotely to a user account on storage array 220 via a secure shell (SSH) using public key authentication. A given support engineer 210 may have their own public-private key pair to log into this account, and this account may not have root privileges by default. This user account may allow support engineer 210 to run non-root support on storage array 220. Additionally, this user account may be prevented from having access to customer data stored in storage array 220 to protect this client data.

In one embodiment, access to the support engineer's user account may be controlled by the standard authorized keys file in the .ssh folder. Multiple different support engineers who are authorized to access the storage array may each have their own public key in the authorized keys file. In one embodiment, a list of support engineers with access to the storage array may be maintained separately from the storage array, and updates to this list may be pushed out as needed using secure copy within SSH. Secure copy refers to a means of securely transferring computer files between hosts, and secure copy is based on the SSH protocol. To revoke access by a particular support engineer, the engineer's public key may be removed from the authorized keys file. Anyone with access to the support engineer user account may do this, or this could be accomplished centrally and pushed out to multiple storage arrays.

A separate public-private key pair may be utilized for the storage array 220 for the encryption of the root password for logging into the root account of storage array 220. The public key may be installed and stored on storage array 220, and the private key may be known only to authorized remote users. In one embodiment, storage array 220 may update the root password on a regular basis. In one embodiment, the root password for a storage array 220 may be a function of two values. The first value may be a random character sequence, and the second value may be a compartment identifier (ID) assigned to storage array 220. In one embodiment, the compartment ID may be a serial number of storage array 220.

In one embodiment, storage array 220 may generate a new password by first generating a random character sequence, which will be referred to as the "root secret". The root secret may then be converted into a hexadecimal (hex) representation using the American Standard Code for Information Interchange (ASCII) character-encoding scheme. Next, a compartment ID may be appended to the hex ASCII form of the root secret, and then this value may be run through a hash function followed by a conversion to a more human-readable form. This value may then be used as the root password. Also, the ASCII representation of the root secret may be encrypted with the public key and stored in a file associated with the root secret. For example, in one embodiment, the ASCII representation of the root secret may be stored in a file named "root-secret-yyyy-mm-dd-hh". This file name may include a time stamp (year, month, day, hour) of when the root secret was generated. An authorized local user of computing device 205 may have access to the stored encrypted root secret, but remote users (e.g., support engineer 210) may not have access to the stored encrypted root secret.

The root password may be utilized to login to the root level user account of storage array 220. The root level user account is a special user account used for system administration on many types of computer operating systems. For example, in Linux® and other Unix®-based operating systems, "root" is the user name or account with access to all commands and files. The root account in Linux includes similarities to the administrator or superuser account in Windows® operating systems. Other operating systems may include administrator accounts that are referred to by different names. It is to be understood that the terms "root", "root account", "root user", and "root privileges" are also meant to refer to other types of administrative or special user accounts with the highest privileges for other types of operating systems.

If there are multiple partitions on storage array 220, then in one embodiment, the root password may be set on all of the partitions. In another embodiment, instead of using the same root password on multiple partitions, the root password may only be updated on the currently-booted partition. The other partition(s) may be updated when they are booted. This will result in a longer-lived password on the non-booted partition(s). This process may be run using a time-based job scheduler (e.g., cron). In one embodiment, a check may be run to ensure that a new password is not generated if there is an existing password less than 24 hours old. This process could then be run on an hourly basis to ensure that a new password is generated on a regular basis. It is noted that the example time periods used in the above description may vary according to the embodiment.

In one embodiment, the most recent older root secrets may be saved in case there is a problem with the most recent password change. This allows storage array 220 to delete root secrets which are older than a few cycles, and provides a limited set of possible root secrets. In one embodiment, the directory with these files storing the encrypted root secrets may be writeable only by root and readable by the local user account of the storage array but not by the remote support engineer account. Using this approach, the only way an authorized support engineer can get root access is if an authorized local user provides the encrypted root secret to the support engineer. Using this approach, the support engineer can login as root if the user provides the encrypted root secret to the support engineer or if the support engineer is physically present at storage array 220 and has the system administrator password or the root secret.

In one embodiment, the root secret may be a combination of words (or syllables) and numbers with at least $2^{70}$ ($10^{21}$) bits of randomness. In one embodiment, the root secret may be generated using words alternating with 4-digit numbers. For example, a root secret may be "food-4981-cat-3340-certain-2096". This may provide about 72 bits of randomness, and is much easier to read and understand than a sequence of random characters.

Figure 3:
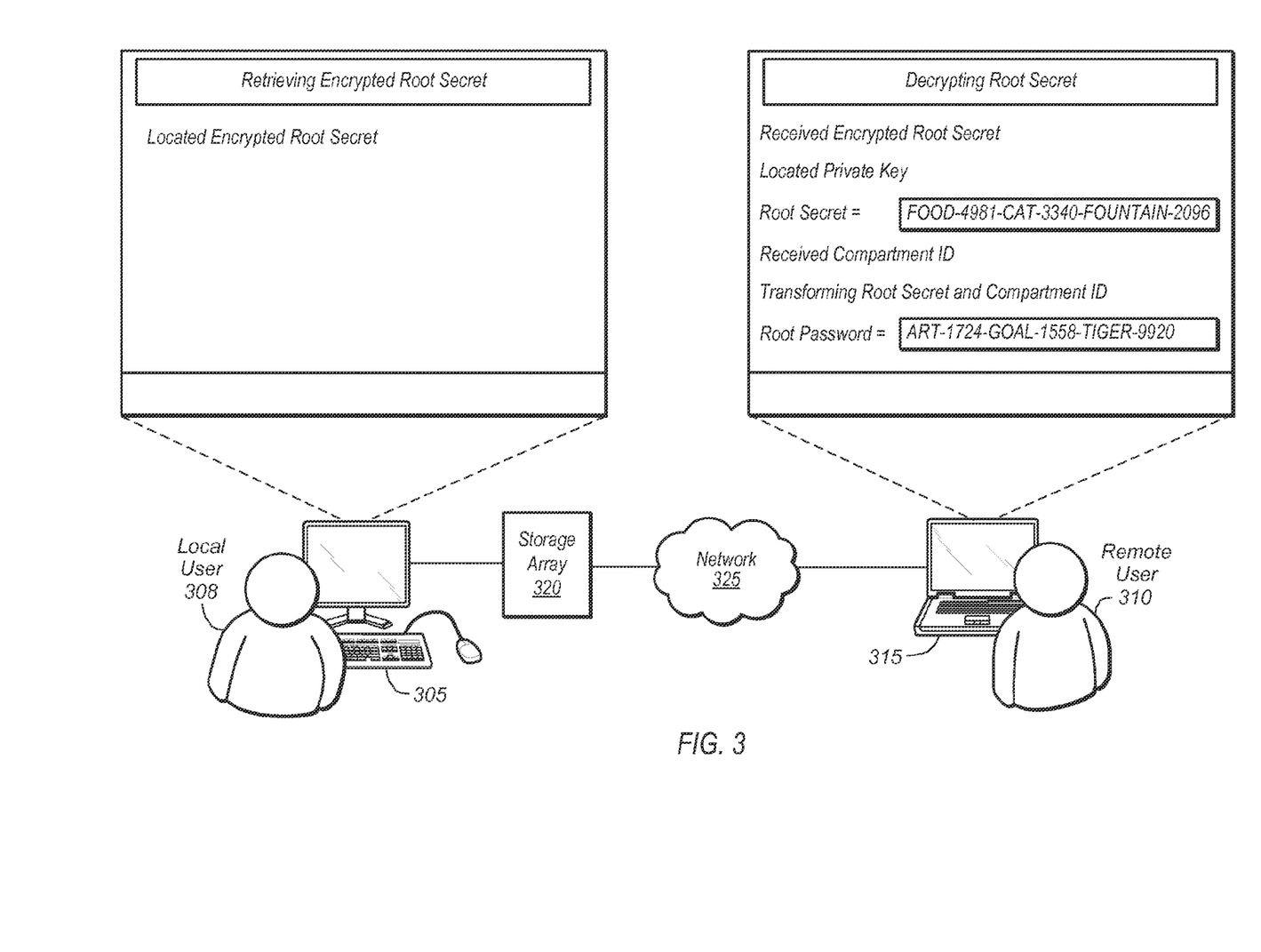
FIG. 3 illustrates one embodiment of a system for regenerating a root password.

Referring now to FIG. 3, a block diagram of another embodiment of a system for providing remote support to a computing device is shown. Local user 308 of workstation 305 may have access to a user account on storage array 320. Remote user 310 may utilize computing device 315 to connect to storage array 320 over network 325 (e.g., Internet). In one embodiment, remote user 310 may be a support engineer for storage array 320. Remote user 310 may not have access to the encrypted root secret stored locally on storage array 320. Remote user 325 may have access to the private key of the public-private key which was used to encrypt the root secret. Local user 308 may not have access to the private key needed to decrypt the encrypted root secret.

When local user 308 determines they need root access to storage array 320, local user 305 may provide the encrypted root secret (along with the compartment ID) to remote user 310. Local user 305 may also provide the compartment ID of storage array 320 to remote user 310. Remote user 310 may receive the encrypted root secret, and then remote user 310 may initiate the process for regenerating the root password on computing device 315. The private key may be stored on computing device 315 or remote user 310 may manually enter the private key on computing device 315. Computing device 315 may then decrypt the encrypted root secret, and the decrypted root secret is shown in the expanded screenshot of computing device 315 as "FOOD-4981-CAT-3340-FOUNTAIN-2096". Next, computing device 315 may combine the compartment ID with the root secret and perform any transformations which are needed to regenerate the root password. The root password is shown as "ART-1724-GOAL-1558-TIGER-9920" in the screenshot. Remote user 310 may then convey the root password to local user 308 to enable local user 308 to login to storage array 320 as the root user. Alternatively, remote user 310 may login to storage array 320 as the root user using the root password.

Figure 4:
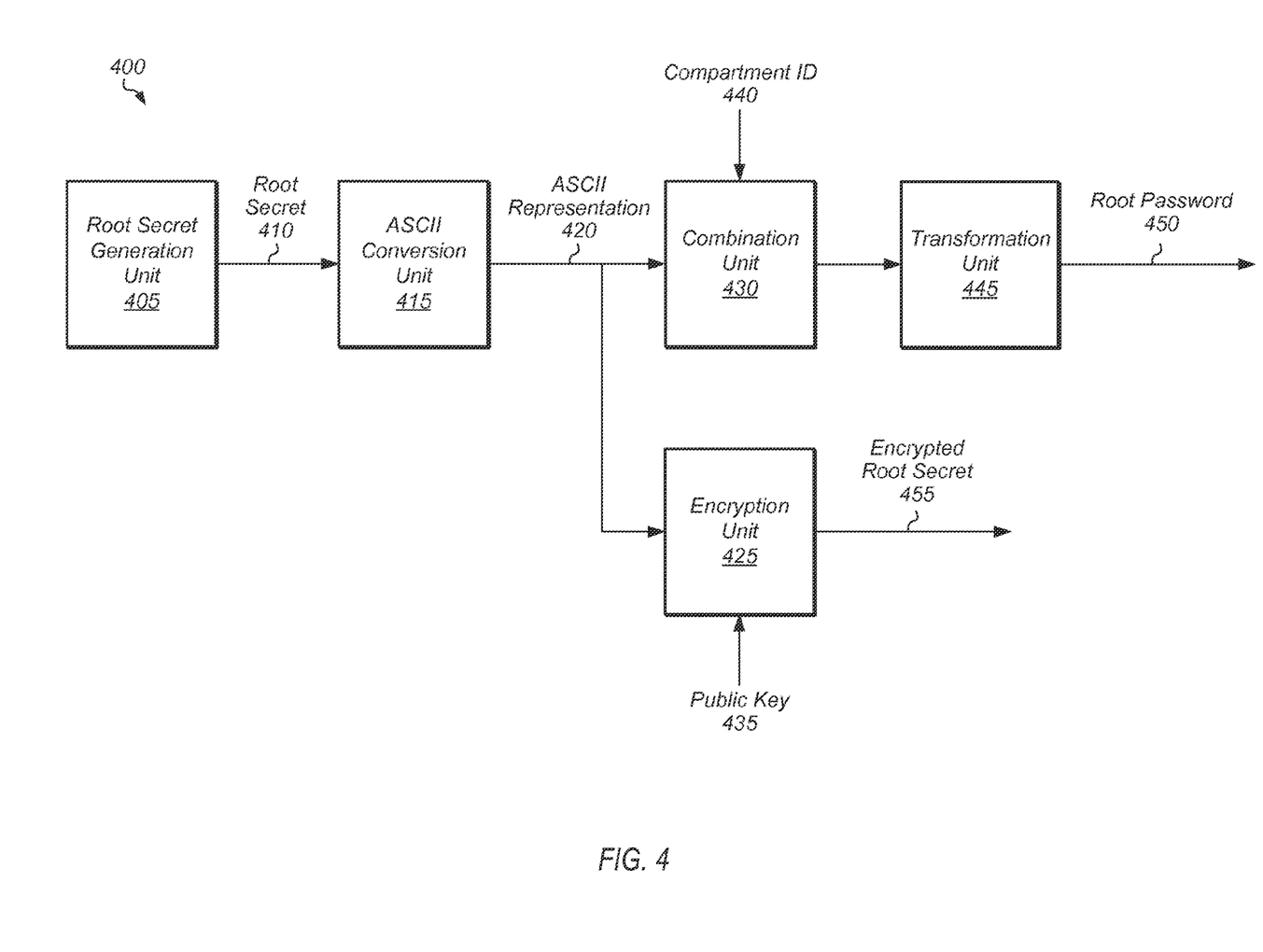
FIG. 4 illustrates a block diagram of one embodiment of a password generation unit.

Referring now to FIG. 4, one embodiment of a password generation unit is shown. Password generation unit 400 may include multiple logic units for generating a root password for a host computing device (not shown). Unit 400 may include root secret generation unit 405, and unit 405 may be configured to generate a random character sequence as root secret 410. For example, in one embodiment, root secret 410 may be built from words alternating with 4-digit numbers. For example, in this embodiment, a randomly generated root secret 410 may be: food-4981-cat-3340-fountain-2096. This may provide about 72 bits of randomness, and is much easier to read and understand than a sequence of 12 random characters. In other embodiments, root secret 410 may be randomly generated using any of a variety of other techniques.

Next, root secret 410 may be converted into an American Standard Code for Information Interchange (ASCII) form by ASCII conversion unit 415. Unit 415 may generate the ASCII representation 420 of the root secret, and this ASCII representation 420 may be conveyed to encryption unit 425 and combination unit 430. Encryption unit 425 may encrypt the ASCII representation 420 of the root secret with public key 435 of a public-private key pair. This encrypted root secret value 455 may be stored locally on the host computing device. In one embodiment, the host computing device may be a storage array. In other embodiments, the host computing device may be any of various other types of computing devices. In one embodiment, encrypted root secret value 455 may be stored in a file named "root-secret-yyyy-mm-dd-hh", where "yyyy-mm-dd-hh" represents a time stamp (year, month, day, and hour) of the time when encrypted root secret value 455 was created.

ASCII representation 420 may also be conveyed to combination unit 430. Unit 430 may also receive compartment ID 440 as an input. In one embodiment, compartment ID 440 may be a serial number of the host computing device, while in other embodiments, compartment ID 440 may be one or more other values specific to the host computing device. In one embodiment, combination unit 430 may append the compartment ID 440 to the end of ASCII representation 420. In other embodiments, combination 430 may perform other combinations and/or transformations (e.g., XOR, hash) on ASCII representation 420 and compartment ID 440. Alternatively, in another embodiment, combination unit 430 may be omitted from password generation unit 400, and ASCII representation 420 may be conveyed directly to transformation unit 445 in this embodiment.

Tranformation unit 445 may perform one or more transformations on the input value to generate root password 450. The type and number of transformations performed by unit 445 may vary according to the embodiment. For example, in one embodiment, unit 445 may run the input value through a hash function followed by a conversion to a more human-friendly form. It is noted that in some embodiments, unit 445 may be omitted from password generation unit 400. After root password 450 is generated, root password 450 may be set as the password on the host computing device.

It is to be understood that the block diagram of password generation unit 400 is merely a logical representation of a password generation unit. The various units shown in password generation unit 400 may be implementing using any combination of hardware and/or software. For example, in one embodiment, one or more software programs executing on one or more computing devices may perform the functions represented by the various units of password generation unit 400. It is noted that password generation unit 400 is merely one example of a password generation unit which may be used in one embodiment. In other embodiments, unit 400 may be organized differently than is shown in FIG. 4. Additionally, in other embodiments, unit 400 may also include other components and/or omit one or more of the components shown in unit 400.

Figure 5:
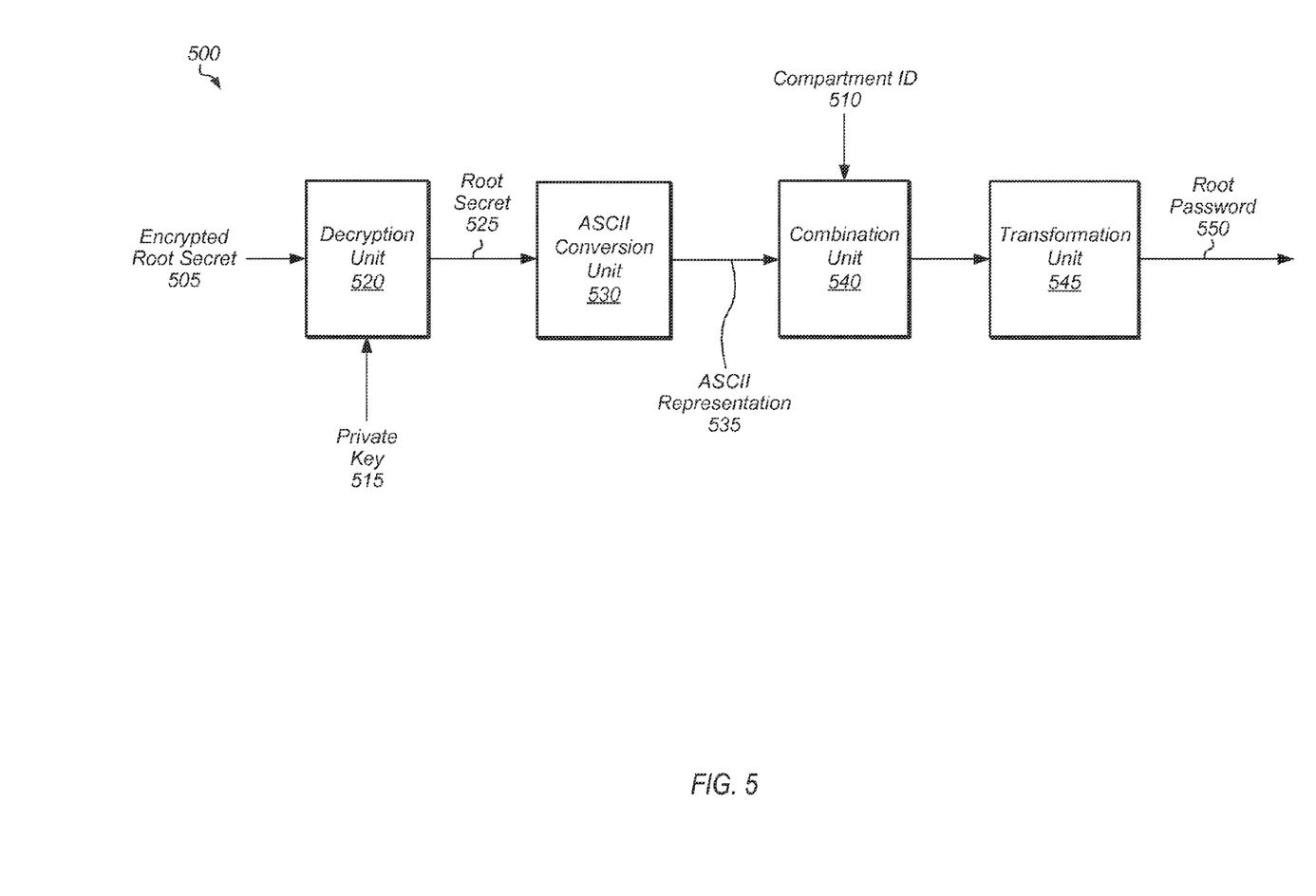
FIG. 5 illustrates a block diagram of one embodiment of a password regeneration unit.

Referring now to FIG. 5, a block diagram of one embodiment of a password regeneration unit 500 is shown. Unit 500 may receive an encrypted root secret 505, compartment ID 510, and private key 515 as inputs. In one embodiment, unit 500 may be located externally to the computing device which actually utilizes the root password being regenerated. Private key 515 may be the private key corresponding to the public key (e.g., public key 435 of FIG. 4) of the public-private key pair which was originally used to encrypt the root secret corresponding to the root password.

Decryption unit 520 may be configured to decrypt encrypted root secret 505 using private key 515. The output of unit 520 may be root secret 525. Root secret 525 may then be converted into its ASCII representation 535 by ASCII conversion unit 530. Then, the ASCII representation 535 may be combined with compartment ID 510 in combination unit 540. Then, the output of combination unit 540 may be conveyed to transformation unit 545. Units 540 and 545 may be configured to reverse the operations that were performed in the analogous units of the corresponding password generation unit (e.g., unit 400 of FIG. 4). The output of unit 545 may be root password 550, which may be utilized by an authorized user to login to the corresponding computing device as the root user with root privileges.

It is to be understood that the block diagram of password regeneration unit 500 is merely a logical representation of a password regeneration unit. The various units shown in password regeneration unit 500 may be implementing using any combination of hardware and/or software. For example, in one embodiment, one or more software programs executing on one or more computing devices may perform the functions represented by the various units of password regeneration unit 500.

It is noted that password regeneration unit 500 is merely one example of a password regeneration unit which may be used in one embodiment. In other embodiments, unit 500 may be organized differently than is shown in FIG. 5. Additionally, in other embodiments, unit 500 may also include other components and/or omit one or more of the components shown in unit 500. It is also noted that in some embodiments, portions of unit 500 may be spread out into multiple locations, with some of the functions performed at the computing device corresponding to the root password and some of the functions performed remotely from a different computing device.

Figure 6:
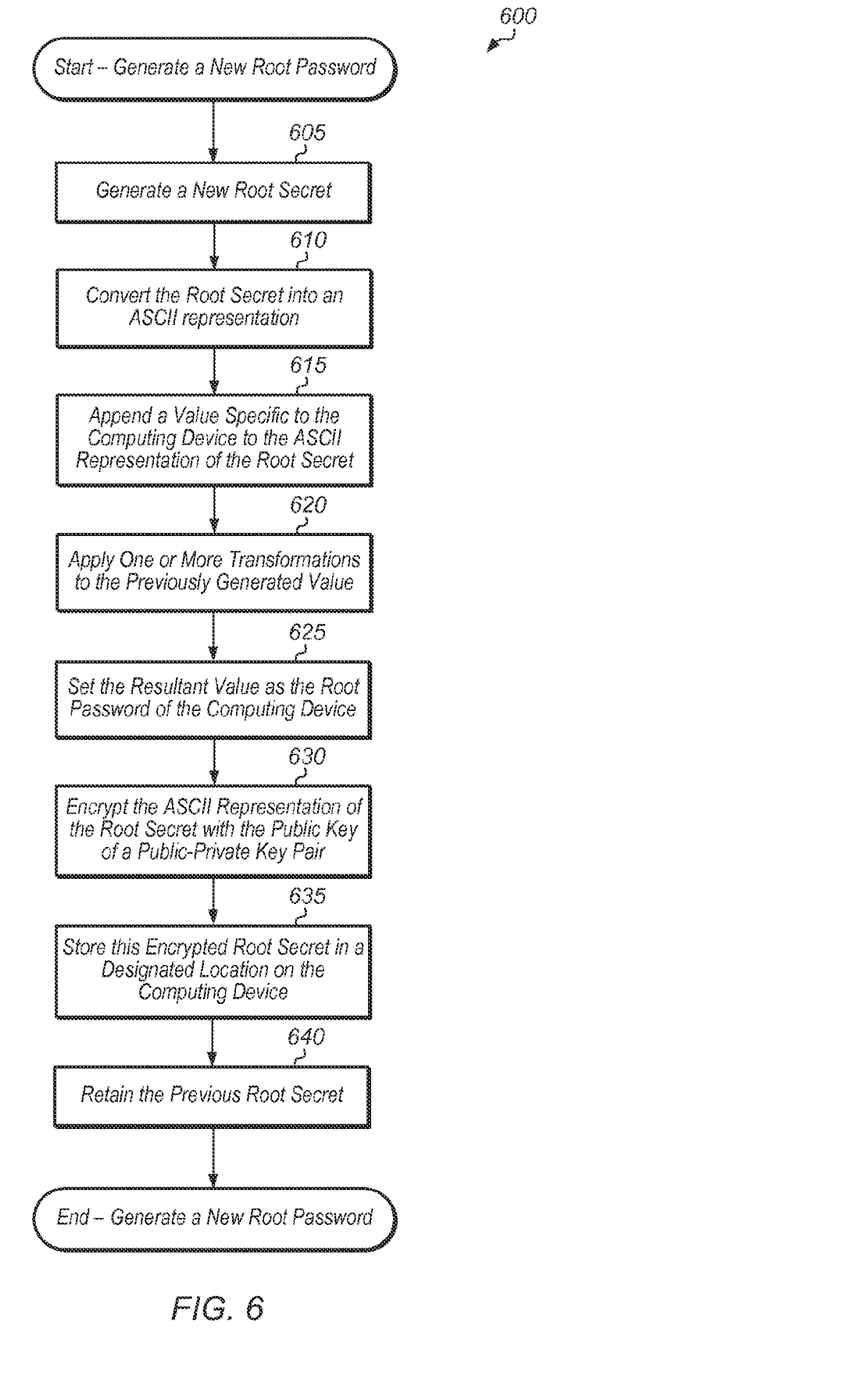
FIG. 6 is a generalized flow diagram illustrating one embodiment of a method for generating a new root password.

Referring now to FIG. 6, one embodiment of a method 600 for generating a new root password is shown. Any of the various computing devices described throughout this specification may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

A computing device may generate a new root secret (block 605). A new root secret may be generated on a regularly scheduled basis (e.g., daily, weekly). In one embodiment, the computing device may be a storage array. In other embodiments, the computing device may be other types of computing devices (e.g., laptop, desktop computer, network server, smartphone). The root secret may be a randomly generated collection of characters. In one embodiment, the root secret may be a combination of words (or syllables) and numbers. The length of the root secret may be chosen so that the root secret has at least a predetermined level of randomness.

Next, the root secret may be converted into an ASCII representation (block 610). In other embodiments, the root secret may be converted into a binary representation using other types of conversions besides ASCII codes. Alternatively, the root secret may be generated in a binary format, effectively combining blocks 605 and 610 into a single step. Next, a value specific to the computing device may be appended to the ASCII representation of the root secret (block 615). In one embodiment, the value specific to the computing device may be the serial number of the computing device. In other embodiments, other types of values may be appended or combined with the root secret. In a further embodiment, the root secret may not be combined with another value. Rather, the root secret may be used by itself for the remaining steps of method 600.

Next, one or more transformations may be applied to the value generated in block 615 (block 620). In one embodiment, these transformations may include running the value through a hash function followed by a conversion to a human-readable form. Then, this resultant value may be set as the root password of the computing device (block 625). If there are multiple partitions on the computing device, then the value generated in block 620 may be set as the root password on all partitions. Alternatively, this value may be set as the root password on only the currently-booted partition, leaving the root password unchanged on the other partitions.

Also, the ASCII representation of the root secret may be encrypted with the public key of the public-private key pair (block 630). Then, this encrypted root secret may be stored in a designated location on the computing device (block 635). In one embodiment, the encrypted root secret may be stored in a file with a file name based on a time stamp of when the root secret and corresponding root password were created. It is noted that blocks 630 and 635 may be performed prior to or simultaneously with blocks 620 and 625. Next, the computing device may retain the previous root secret in case there is a problem with the new root secret (block 640). The computing device may retain several previous root secrets and delete old root secrets only if they are older than a certain threshold number of refresh cycles. The directory with these files of encrypted root secrets may be writeable only by root and readable by the local user account but not by the accounts utilized by remote users (e.g., off-site support engineers). In this way, a support engineer can only get root access if a local user provides the encrypted root secret by logging in to the local user account.

Method 600 may be run on a regularly scheduled basis (e.g., daily, weekly). In one embodiment, a new root password may be generated on a daily basis. In this embodiment, a check may be run on the computing device to ensure that a new root password is not generated if there is an existing root password that is less than 24 hours old. Method 600 could then be run on a hourly basis, with the check performed first to prevent method 600 from continuing if there is an existing root password that is less than 24 hours old.

Figure 7:
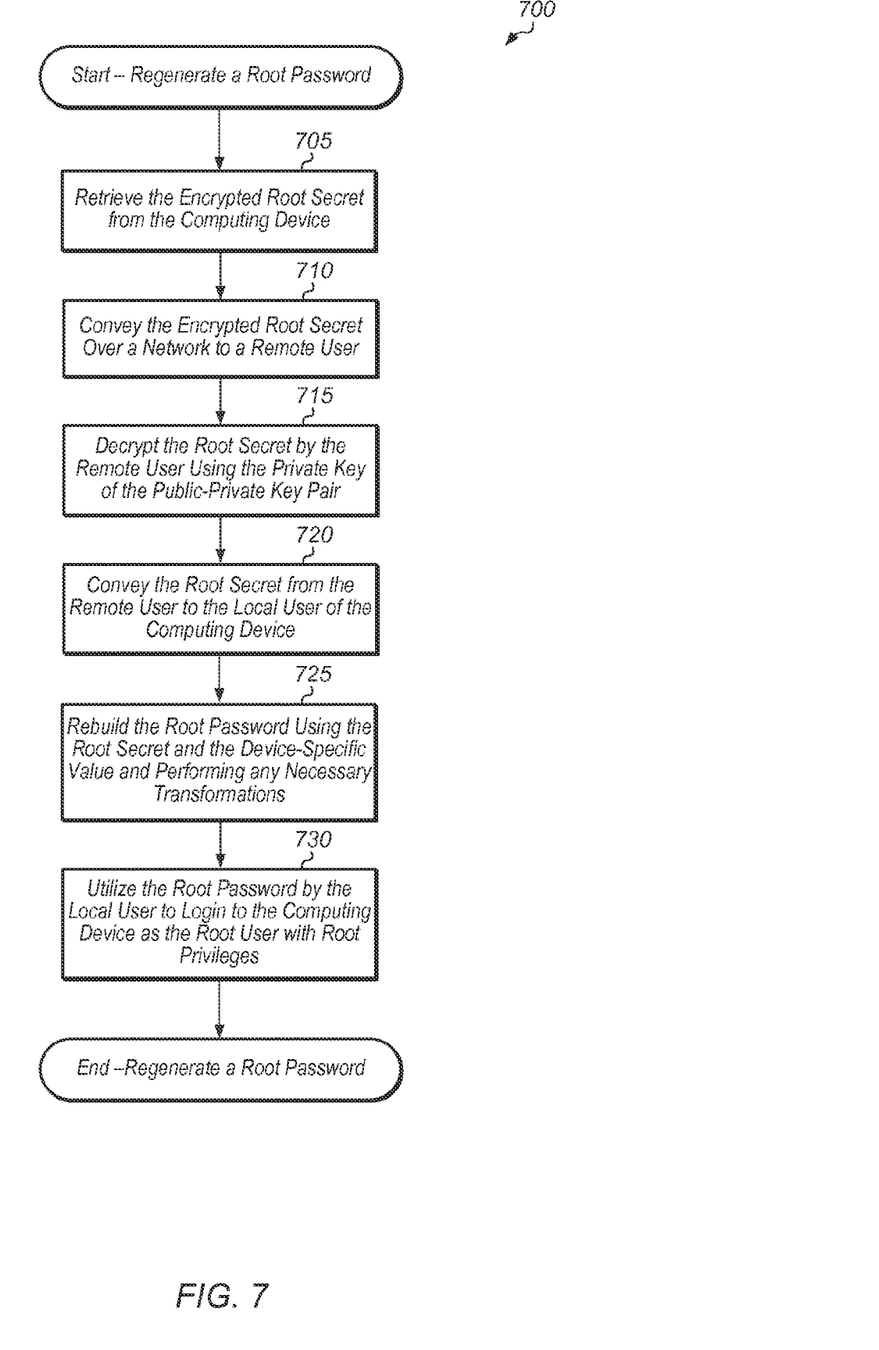
FIG. 7 is a generalized flow diagram illustrating one embodiment of a method for regenerating a root password.

Referring now to FIG. 7, one embodiment of a method 700 for regenerating a root password is shown. Any of the various computing devices described throughout this specification may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

The encrypted root secret may be retrieved from its host computing device (block 705). In one embodiment, the encrypted root secret may be retrieved from the appropriate directory by a local user of the host computing device. Next, the encrypted root secret may be conveyed over a network to a remote user (block 710). In one embodiment, the remote user may be a support engineer with access to the private key of the public-private key pair needed to decrypt the root secret, and the remote user may be connected to the computing device over the Internet. Next, the root secret may be decrypted by the remote user using the private key of the public-private key pair (block 715). Then, the root secret may be conveyed from the remote user to the local user of the computing device (block 720). Next, the root password may be rebuilt using the root secret and the device-specific value and by performing any necessary transformations (block 725). Various transformations may be performed to reverse any transformations that were implemented when the root password was originally generated. Alternatively, in another embodiment, the remote user may rebuild the root password and then convey the root password to the local user. Next, the local user may utilize the root password to login as the root user with root privileges on the computing device (block 730). Alternatively, the remote user may utilize the root password to login as the root user with root privileges on the computing device.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a second computing device connected remotely to a first computing device;
wherein the second computing device includes a computer processor and a computer readable storage medium, the computer readable storage medium includes computer program instructions that when executed by the computer processor cause the second computing device to carry out the steps of:
- requesting access to the first computing device, wherein the first computing device is accessed using a root password generated by applying a transformation to a combination of a root secret and a value specific to the first computing device;
- in response to requesting access to the first computing device, receiving an encrypted root secret from the first computing device, wherein the encrypted root secret is encrypted by the first computing device based on a public key of a public-private key pair;
- decrypting the encrypted root secret using a private key of the public-private key pair to generate the root secret;
- rebuilding the root password based on the combination of the root secret and the value specific to the first computing device, wherein rebuilding the root password comprises reversing the previous transformation performed on the combination of the root secret and the value specific to the first computing device; and
- providing to the first computing device, the root password for root access to the first computing device.

2. The system as recited in claim 1, performing one or more additional transformations on the root secret to rebuild the root password.

3. The system as recited in claim 2, wherein performing the one or more transformations on the root secret comprises applying a hash function to the root secret.

4. The system as recited in claim 1, wherein the transformation includes generating an american standard code for information interchange (ASCII) representation of the root secret.

5. The system as recited in claim 1, wherein the first computing device includes a computer readable storage medium having computer program instructions that when executed by a processor cause the first computing device to carry out the steps of retaining a previously stored root secret after generating a new root secret and a new root password.

6. The system as recited in claim 1, wherein the first computing device includes a computer readable storage medium having computer program instructions that when executed by the computer processor cause the first computing device to carry out the steps of: determining if an age of an existing root secret exceeds a threshold prior to generating a new root secret.

7. A method comprising:
- by computer program instructions on a second computing device remotely coupled to a first computing device,
- requesting access to the first computing device, wherein the first computing device is accessed using a root password generated by applying a transformation to a combination of a root secret and a value specific to the first computing device;
- in response to requesting access to the first computing device, receiving an encrypted root secret from the first computing device, wherein the encrypted root secret is encrypted by the first computing device based on a public key of a public-private key pair;
- decrypting the encrypted root secret using a private key of the public-private key pair to generate the root secret;
- rebuilding the root password based on the combination of the root secret and the value specific to the first computing device, wherein rebuilding the root password comprises reversing the previous transformation performed on the combination of the root secret and the value specific to the first computing device; and
- providing to the first computing device, the root password for root access to the first computing device.

8. The method as recited in claim 7, further comprising performing one or more additional transformations on the root secret to rebuild the root password.

9. The method as recited in claim 8, wherein performing the one or more transformations on the root secret comprises applying a hash function to the root secret.

10. The method as recited in claim 7, wherein the transformation includes generating an american standard code for information interchange (ASCII) representation of the root secret.

11. The method as recited in claim 7, further comprising retaining, by the first computing device, a previously stored root secret after generating a new root secret and a new root password.

12. The method as recited in claim 7, further comprising determining, by the first computing device, if an age of an existing root secret exceeds a threshold prior to generating a new root secret.

13. A non-transitory computer readable storage medium storing computer program instructions that when executed by a processor cause the processor to carry out the steps of:
- requesting access to the first computing device, wherein the first computing device is accessed using a root password generated by applying a transformation to a combination of a root secret and a value specific to the first computing device;
- in response to requesting access to the first computing device, receiving an encrypted root secret from the first computing device, wherein the encrypted root secret is encrypted by the first computing device based on a public key of a public-private key pair;
- decrypting the encrypted root secret using a private key of the public-private key pair to generate the root secret;
- rebuilding the root password based on the combination of the root secret and the value specific to the first computing device wherein rebuilding the root password comprises reversing the previous transformation performed on the combination of the root secret and the value specific to the first computing device; and
- providing to the first computing device, the root password for root access to the first computing device.

14. The computer readable storage medium as recited in claim 13, further comprising computer program instructions that when executed by the processor cause the processor to carry out the steps of: performing one or more additional transformations on the root secret to rebuild the root password.

15. The computer readable storage medium as recited in claim 14, wherein performing the one or more transformations on the root secret comprises applying a hash function to the root secret.

16. The computer readable storage medium as recited in claim 13, wherein the transformation includes generating an american standard code for information interchange (ASCII) representation of the root secret.

* * * * *